United States Patent [19]

Yato et al.

[11] Patent Number: 4,882,100
[45] Date of Patent: Nov. 21, 1989

[54] UO2 PELLET FABRICATION PROCESS

[75] Inventors: Tadao Yato, Mito; Takeshi Onoue, Katsuta; Hiroshi Tanaka, Omiya, all of Japan

[73] Assignee: Mitsubishi Kinzoku Kabushiki Kaisha, Tokyo, Japan

[21] Appl. No.: 296,802

[22] Filed: Jan. 13, 1989

[30] Foreign Application Priority Data

May 25, 1988 [JP] Japan ................................. 63-127934

[51] Int. Cl.$^4$ ........................ C09K 11/04; G21G 4/00; G21G 43/025; G21C 21/00
[52] U.S. Cl. .................................... 264/0.5; 252/636; 252/643; 423/258; 423/260; 423/261
[58] Field of Search ................ 264/0.5; 252/643, 636, 252/637; 423/253, 254, 258, 260, 261

[56] References Cited

U.S. PATENT DOCUMENTS

| | | | |
|---|---|---|---|
| 3,998,925 | 12/1976 | Fuller | 423/261 |
| 4,079,120 | 3/1978 | Cole et al. | 423/261 |
| 4,090,976 | 5/1978 | DeHollander et al. | 423/261 |
| 4,120,936 | 10/1978 | DeLuca et al. | 423/261 |
| 4,234,550 | 11/1980 | DeHollander | 423/261 |
| 4,505,882 | 3/1985 | Hasegawa et al. | 423/261 |
| 4,666,691 | 5/1987 | Hasegawa | 423/260 |
| 4,687,601 | 8/1987 | Bachelard et al. | 252/638 |
| 4,788,048 | 11/1988 | Tanaka et al. | 423/261 |

FOREIGN PATENT DOCUMENTS

| | | |
|---|---|---|
| 62-1581 | 1/1987 | Japan . |
| 62-197318 | 9/1987 | Japan . |
| 62-278128 | 12/1987 | Japan . |
| 62-297215 | 12/1987 | Japan . |
| 63-45127 | 2/1988 | Japan . |
| 63-74916 | 4/1988 | Japan . |
| 63-79725 | 4/1988 | Japan . |

*Primary Examiner*—Howard J. Locker
*Attorney, Agent, or Firm*—Oblon, Spivak, McClelland, Maier & Neustadt

[57] ABSTRACT

A process of fabricating UO$_2$ pellets comprising the steps of filtering and drying a slurry of ammonium diuranate (ADU) including ammonium fluoride (NH$_4$F), in order to form ADU powder, and then subjecting the ADU powder to calcining, reducing, compacting and sintering treatments, to form UO$_2$ pellets.

4 Claims, No Drawings

UO2 PELLET FABRICATION PROCESS

BACKGROUND OF THE INVENTION

The present invention relates to a process of fabricating $UO_2$ pellets on the basis of an ADU (ammonium diuranate) process, and more particularly, to such an improvement as to coarsen $UO_2$ crystals in the pellets, that is, to bring the $UO_2$ crystals to a large grain size, thereby raising their retaining power for fission-product gas (FP gas).

In order to allow to burn $UO_2$ pellets fuel within a nuclear reactor in a stable manner, it is desirable to decrease the FP gas release from the pellets as low as possible.

According to the results of various irradiation tests and experiments which have been conducted up to now, it is known that if the grain size of the pellets which is usually on the order of 10 to 20 $\mu$m, is brought to a higher value, the retention of the FP gas is enhanced. There is some concern, however, that excessively large grain size of the pellets will result in a reduction in the mechanical strength thereof. Although an optimum grain size has not yet been ascertained, it is estimated that the target for the upper limit of the grain size is approximately 100 $\mu$m.

Two methods are known as means for enlarging the grain size of $UO_2$ pellets. In the first of the known methods, additives such as, for example, niobia ($Nb_2O_5$), titania ($TiO_2$), or the like, which have a grain growth-accelerating function, are added to $UO_2$ powder. The mixture of the powder and additives are then compacted and sintered. The second known method is one in which the sintering conditions for the pellets are controlled. Specifically, an oxidizing gas, such as $CO_2$ gas, or the like, is used as the sintering atmosphere for the pellets. A similar effect is achieved when sintering is carried out at a higher temperature and over a longer period of time than that usually employed in the sintering process (1700° to 1800° C. and 2 to 8 hours), thereby enhancing grain growth.

However, the aforesaid first method is not desirable, because there is a possibility that the use of the additives may alter the thermal properties of the material such as the melting point, thermal conductivity, thermal expansion, and the like. On the other hand, it is difficult to carry out the aforesaid second method because it is necessary to considerably modify the fabrication for the pellets, resulting in an increase of costs and in a sizable reduction of productivity.

In light of the above considerations, it would be desirable to have a method in which it is not necessary to alter fabrication conditions and in which no alteration of the thermal properties of the pellets results. The above demand can be carried out relatively easily by improving the performance of the $UO_2$ powder, that is a high active powder can be used for a raw material of the large grain size pellets.

Typically, in the ADU method employed to fabricate the $UO_2$ powder, an aqueous solution of uranyl fluoride ($UO_2F_2$), obtained by reacting $UF_6$ gas and water with each other, is then reacted with ammonia to form ADU precipitate. The precipitated ADU is then filtered and dried. Thereafter, the ADU is calcined and reduced, and is formed into $UO_2$ powder. However, the $UO_2$ powder obtained by the ADU method is relatively low in activity, and as a result, only pellets with grains on the order of 10 $\mu$m can be produced.

In addition to the above-mentioned ADU method, there is also another ADU method which utilizes an aqueous solution of uranyl nitrate ($UO_2(NO_3)_2$) as the raw material. In this other ADU method, $UF_6$ gas, for example, is hydrolyzed in a nitrate solution that contains a defluorination agent, to form $UO_2(NO_3)_2$ aqueous solution. This solution is then refined by means of solvent extraction. Subsequently, the aqueous solution is reacted with ammonia to form ADU. The ADU is then filtered and dried and, thereafter, is calcined and reduced to form $UO_2$ powder. Using this method can result in a $UO_2$ powder which is higher in activity than that obtained by the first-mentioned ADU method. It has been found, however, that even if the $UO_2$ powder of relatively high activity is employed, only pellets having grain sizes on the order of 20 $\mu$m are obtained in practice. This fact suggests that in order to increase grain size, it will be necessary not only to raise the activity of the $UO_2$ powder, but also to raise cohesiveness, and the like, of the powder. Thus, it has been difficult for each of the conventional $UO_2$ powder fabrication processes to produce pellets having grain equal to or larger than 20 $\mu$m.

SUMMARY OF THE INVENTION

The invention seeks to solve the above-discussed problems, and it is an object of the invention to provide a process of fabricating $UO_2$ pellets in which the grain size can be controlled to preselected values between 20 and 100 $\mu$m.

DETAILED DESCRIPTION

A process of fabricating $UO_2$ pellets, according to the invention, will be specifically described below.

The method according to the invention is characterized in that an ADU slurry containing $NH_4F$ is filtered and dried to form ADU powder in which the content of $NH_4F$ is within a range of from about 0.001 to 5 % by weight and, subsequently, the thus obtained ADU powder is subjected to calcining and reducing, compacting and sintering treatments, to form $UO_2$ pellets having grain size within a range of from about 20 to 100 $\mu$m.

As described previously, the presence of the $NH_4F$ in the ADU slurry causes the ADU to cohere after having been subjected to the filtering and drying treatments. In order to obtain pellets with grain size within the range of from about 20 to 100 $\mu$m, it is necessary to control the $NH_4F$ content in the ADU after having been filtered and dried, to a value within the range of from about 0.001 to 5 % by weight. The $NH_4F$ content in the final dried ADU can easily be controlled by adjusting the concentration of the $NH_4F$ at the slurry stage, and the water content of the ADU cake after the filtration. In addition thereto, it is also similarly effective to spray an aqueous solution containing the $NH_4F$ on an ADU cake formed by filtration of the ADU slurry.

If the $NH_4F$ content in the aforesaid ADU powder is less than 0.001 % by weight, the problem arises that the cohesiveness of the ADU powder is insufficient, and moreover, gaps may occur in the crystal structure during sintering so that grain growth does not proceed sufficiently. On the other hand, if the $NH_4F$ content is higher than 5 % by weight, an excess of fluorine will remain when the ADU is calcined and reduced to transform it into $UO_2$. In addition thereto, many gas bubbles remain therein, so that when pellets are formed out of such $UO_2$ powder, each of the sintered density and the grain size are not brought to a sufficiently high value.

Further, it is desirable that the primary particles of the ADU in the ADU slurry in the above-mentioned process are fine particles on the order of less than 1 μm. Such ADU can easily be obtained by reaction of $UO_2(NO_3)_2$ aqueous solution with ammonia. In addition thereto, fine ADU on the order of less than 1 um can also be obtained from the following raw materials, that is a $UO_2F_2$ aqueous solution formed by dissolving, $UO_2F_2$ powder into water, or by removing HF, by means of membrane separation or the like from a hydrolyzed aqueous solution of $UF_6$ and water. A powder of $UO_2$ obtained from ADU having large primary particles is low in activity, and accordingly, only pellets of relatively small grain size can be formed from such $UO_2$ powder.

Additionally, the invention is easily applicable to cases where the starting material includes material other than ADU. For instance, a situation will be considered in which $UF_6$ is reacted with carbon dioxide gas, ammonia gas and water to form ammonium uranyl carbonate (AUC), and the AUC is then employed as a starting material and is later successively subjected to calcining, reducing, compacting, and sintering treatments in that order, thereby fabricating $UO_2$ pellets. Also, in this case, the combination of the AUC and the $NH_4F$ under conditions similar to this invention makes it possible to fabricate $UO_2$ pellets containing grains within the range of from 20 to 100 μm.

EXAMPLES

Advantages of the invention will next be stated with reference to an experiment. An aqueous solution of $UO_2(NO_3)_2$, formed by dissolving uranyl nitrate crystals into water, was prepared at a concentration of 200 gU/l, and similarly, an aqueous solution of $UO_2F_2$ formed by dissolving $UO_2F_2$ powder into water was prepared at a concentration of 200 gU/l. Each of these aqueous solutions was supplied, together with ammonia water, to its own settling chamber so that the molar ratio of $NH_3/U$ was equal to 9. The aqueous solution and the ammonia water were then agitated to form a precipitate of ADU.

Subsequently, the ADU precipitate was filtered and then rinsed sufficiently, and was the mixed with water to form a slurry at 300g ADU/l. $NH_4F$ was then added to the slurry to bring the concentration of the $NH_4F$ in the ADU slurry to a number of values between 0.0 to 30 g/l. The ADU slurry was then filtered and dehydrated to form a ADU cake containing a predetermined proportion of $NH_4F$. The dried ADU cake was calcined and reduced at 650 °C. in a $H_2$ atmosphere, and was thereby transformed into $UO_2$ powder. The $UO_2$ powder was then compacted at 4 t/cm², and was later sintered in a $H_2$ atmosphere under conditions of 1750° C.×4 hours to form pellets.

Measurements were then made of the sintered density and the grain size in the thus obtained pellets, to ascertain the relationship of the $NH_4F$ content in the dehydrated ADU cake to sintered density and grain size. This was done for two ADU raw material aqueous solutions, $UO_2(NO_3)_2$ and $UO_2F_2$. The results are listed in the tables 1 and 2 below.

TABLE 1

| ADU RAW MATERIAL AQUEOUS SOLUTION | $NH_4F$ CONTENT IN DRIED ADU (% by weight) | $UO_2$ PELLETS SINTERED DENSITY (% TD) | GRAIN SIZE (μm) |
|---|---|---|---|
| $UO_2(NO_3)_2$ AQUEOUS SOLUTION | 0.0 | 97.3 | 19 |
| | 0.001 | 97.4 | 20 |
| | 0.01 | 98.2 | 32 |
| | 0.1 | 99.1 | 63 |
| | 0.5 | 99.4 | 96 |
| | 1.2 | 98.7 | 45 |
| | 4.9 | 97.6 | 21 |
| | 5.2 | 96.8 | 17 |

TABLE 2

| ADU RAW MATERIAL AQUEOUS SOLUTION | $NH_4F$ CONTENT IN DRIED ADU (% by weight) | $UO_2$ PELLETS SINTERED DENSITY (% TD) | GRAIN SIZE (μm) |
|---|---|---|---|
| $UO_2F_2$ AQUEOUS SOLUTION | 0.1 | 99.0 | 49 |
| | 0.6 | 99.3 | 98 |
| | 1.5 | 98.6 | 37 |
| | 4.6 | 97.9 | 25 |
| | 5.5 | 96.2 | 14 |

The tables above shows the results of the effect of varying concentrations of $NH_4F$ on sintered density and grain size in the two ADU raw materials aqueous solutions $UO_2(NO_3)_2$ and $UO_2F_2$. When $UO_2(NO_3)_2$ was used as the raw material, the proportion of $NH_4F$ in the dehydrated ADU was varied from 0.0 to 5.2 %. The sintered density and grain size in the pellets first increased, then reacted a maximum at 0.5 %, and later declined. When the proportion of $NH_4F$ was about 0.001 % by weight, the pellets had grain sizes of about 20 μm. When the proportion of $NH_4F$ was about 0.5 % by weight, grain sizes was nearly 100 um, the desired maximum. When the proportion of $NH_4F$ exceeds 0.5 % by weight, both the sintered density and the grain size decrease. The grain size in the pellets begins to decline with further increases in the proportion of $NH_4F$ until it is again about 20 μm at 5 % by weight of the $NH_4F$. Thus, the control of the $NH_4F$ content to a value within the range of 0.001 to 5 % by weight makes it possible to fabricate grains of the desired size between 20 and 100 μm. A similar test was conducted using $UO_2F_4$ as the ADU raw material aqueous solution, instead of $UO_2(NO_3)_2$. The $NH_4F$ content was varied between 0.1 and 5.5 % by weight. In this case, the maximum sintered density and grain size was seen at a $NH_4F$ content of 0.6.

As described above, according to the $UO_2$ pellet fabrication process of the invention, the cohesiveness of the ADU can be enhanced by addition of $NH_4F$, making it possible to optimally select the grain size of the $UO_2$ pellets to a value within the range of 20 to 100 μm, without a great alteration of the physical properties of the $UO_2$ pellets, and without substantial changes in the fabrication processes.

What is claimed is:

1. A process for fabricating $UO_2$ pellets having large-grained $UO_2$ crystals therein, which comprises:
    (a) filtering and drying a slurry of ammonium diuranate containing about 0.001 to 5 wt. % of ammonium fluoride to provide a powder of said ammonium diuranate and ammonium fluoride; and
    (b) subjecting said powder to calcining, reducing, compacting and sintering, to thereby form $UO_2$ pellets containing crystals having an average grain-size in the range of about 20 to 100 μm.

2. The process as claimed in claim 1, wherein said slurry of ammonium diuranate contains primary particles of ammonium diuranate on the order of less than 1 μm.

3. The process as claimed in claim 1, wherein said dried ammonium diuranate is calcined and reduced at about 650° C. in a hydrogen atmosphere, thereby forming $UO_2$ powder.

4. The process as claimed in claim 3, wherein said formed $UO_2$ powder is compacted at about 4 t/cm$^2$, and then sintered in a hydrogen atmosphere at about 1750° C. for about 4 hours to form said $UO_2$ pellets.

* * * * *